United States Patent [19]
Yagi et al.

[11] Patent Number: 5,248,010
[45] Date of Patent: Sep. 28, 1993

[54] ACCELERATION SLIP CONTROL DEVICE FOR A VEHICLE

[75] Inventors: Yoshifumi Yagi, Toyota; Takayoshi Nakatomi, Susono; Kiyoyuki Uchida, Toyota; Hiroshi Igata, Okazaki, all of Japan

[73] Assignee: Toyota Jidosha Kabushiki Kaisha, Toyota, Japan

[21] Appl. No.: 790,480

[22] Filed: Nov. 12, 1991

[30] Foreign Application Priority Data

Nov. 14, 1990 [JP] Japan .................. 2-306090

[51] Int. Cl.⁵ ............................................. B60K 28/16
[52] U.S. Cl. .................................. 180/197; 364/426.03
[58] Field of Search ............... 180/197; 364/426.01, 364/426.03; 123/333, 336

[56] References Cited

U.S. PATENT DOCUMENTS

| | | | |
|---|---|---|---|
| 4,729,608 | 3/1988 | Fennel et al. | 180/197 |
| 4,736,814 | 4/1988 | Yogo et al. | 364/426.03 |
| 4,765,430 | 8/1988 | Schulze et al. | 180/197 |
| 4,811,808 | 3/1989 | Matsumoto et al. | 180/197 |
| 4,823,269 | 4/1989 | Fujioka et al. | 180/197 |
| 4,873,639 | 10/1989 | Sato et al. | 180/197 |
| 4,974,694 | 12/1990 | Matsumoto | 180/197 |
| 5,025,882 | 6/1991 | Ghoneim et al. | 180/197 |
| 5,079,709 | 1/1992 | Hirako et al. | 180/197 |
| 5,090,511 | 2/1992 | Kabasin | 364/426.03 |

FOREIGN PATENT DOCUMENTS

| | | |
|---|---|---|
| 1174662 | 3/1986 | European Pat. Off. . |
| 0298232 | 1/1989 | European Pat. Off. . |
| 2634698 | 6/1989 | France . |
| 61-116033 | 6/1986 | Japan . |
| 64-7102 | 1/1989 | Japan . |
| 3644138 | 7/1988 | Netherlands . |
| WO89/05743 | 12/1987 | PCT Int'l Appl. . |

Primary Examiner—Robert J. Oberleitner
Assistant Examiner—Kevin Hurley
Attorney, Agent, or Firm—Kenyon & Kenyon

[57] ABSTRACT

An acceleration slip control device for a vehicle, by which the slip between driving wheels and a road surface during a start and an acceleration of a vehicle is maintained at level ensuring a good acceleration and straight line running stability. The device controls the slippage of the driving wheel by adjusting a drive torque according to the amount of a deviation of the actual speed of rotation of the driving wheels from a target speed of the driving wheels. The drive torque is controlled in such a manner that the rate of change of the drive torque includes a component proportional to the rate of change of the slippage of the driving wheels and the proportional factor is selected in such a manner that the proportional factor is larger when the component acts to increase the drive torque and is smaller when the component acts to decrease the drive torque.

6 Claims, 11 Drawing Sheets

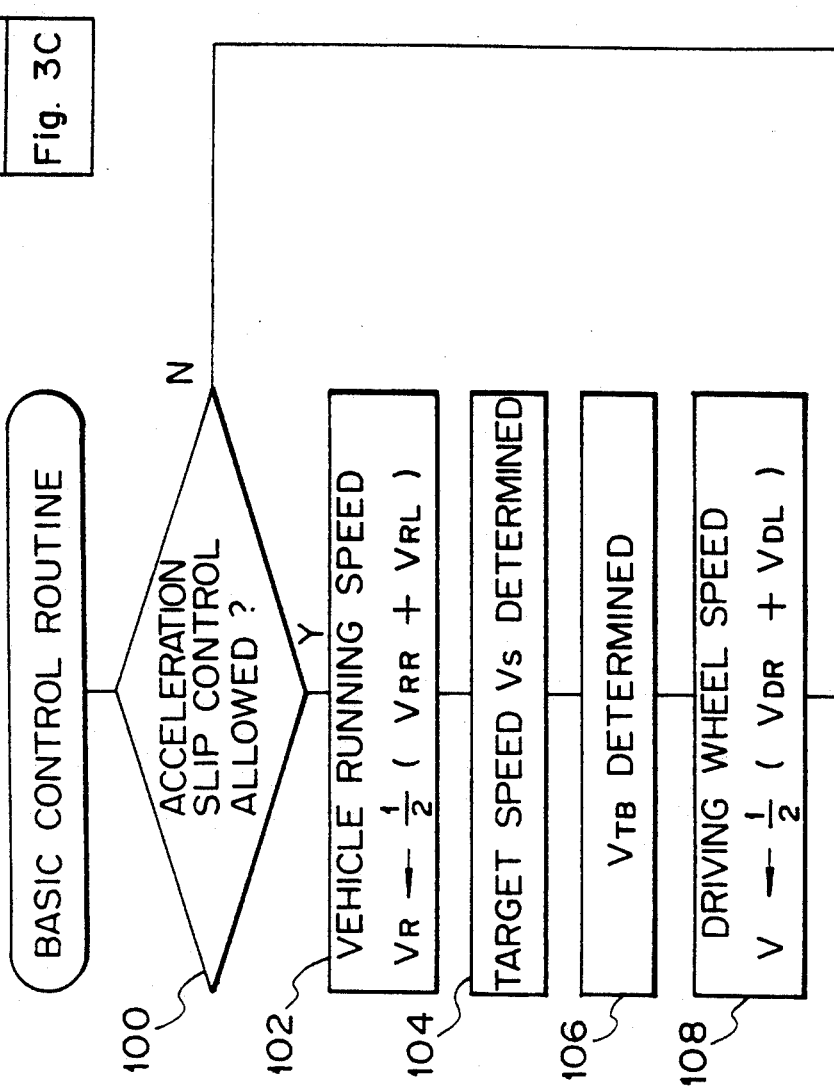

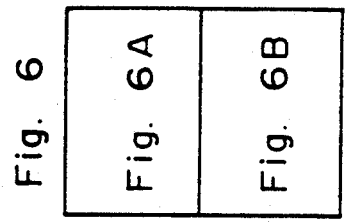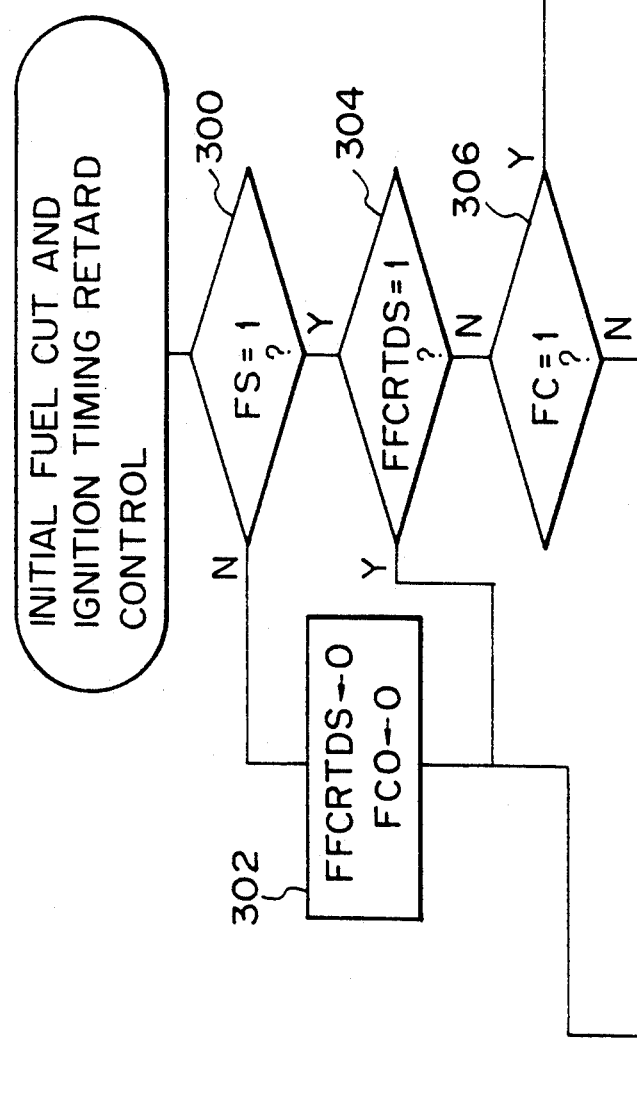

ACCELERATION SLIP CONTROL DEVICE FOR A VEHICLE

BACKGROUND OF THE INVENTION

1. Field of the Invention

This invention relates to an acceleration slip control device for a vehicle by which a slipping of the driving wheels of the vehicle during a start or acceleration of the vehicle is controlled.

2. Description of the Related Art

An acceleration slip control device is commonly used to improve the acceleration and straight line running stability of the vehicle, by preventing an excess slippage of the driving wheels during a start or acceleration of the vehicle.

Usually, the acceleration slip control device determines a target value for the speed of rotation of the driving wheels, and calculates the difference between the target value and the actual speed of rotation of the driving wheel (hereinafter called the deviation from the target speed). The acceleration slip control device controls the amount of slippage of the driving wheel so that the deviation from the target speed is maintained at less than a predetermined value.

To obtain a better response, a feedback control of the slippage is carried out by using a proportional integral and derivative control (PID control) or a proportional and derivative control (PD control).

For example, an acceleration slip control device in which a drive torque of the driving wheel is PID controlled, based on the slippage, is disclosed by Japanese Unexamined Patent Publication No. 64-7102.

It was found through experiment, however, that, although this type of control device based on a PID or PD control shows a good response and high stability on a flat road, the acceleration of the vehicle on a rough road is worsened because the drive torque is usually set lower by this type of control.

On a rough road, the rate of change of the slippage of the driving wheels varies much more than on a flat road, and since the rate of change of the slippage (i.e., derivative term) is a factor for determining the drive torque in the PID or PD control, it is considered that large variations of the rate of change of the slippage adversely affect the control of the drive torque and cause a small increase of the drive torque while greatly reducing the torque.

SUMMARY OF THE INVENTION

Therefore, an object of the present invention is to solve the above problems by providing an acceleration slip control device in which the drive torque is PID or PD controlled based on the difference between the target speed and the actual speed of the driving wheels while using a different gain setting for the derivative term (the rate of change of the difference), depending on whether the rate of change is positive or negative.

According to the present invention, there is provided an acceleration slip control device comprising: a first parameter means for setting a first parameter relating to an amount of slippage between driving wheels of a vehicle and a road surface; a second parameter means for setting a second parameter relating to a rate of change of an amount of slippage between the driving wheels and a road surface; a control means for generating a control signal based on the first and second parameters, the control signal including at least a component proportional to the second parameter; and a drive torque adjusting means for adjusting a drive torque of said driving wheels in such a manner that the rate of change of the drive torque is determined according to the control signal; a proportional factor of the component of the control signal to the second parameter is selected according to the value of the second parameter in such a manner that the value of the proportional factor selected when the component acts for an increase of the drive torque is larger than the value of the proportional factor selected when the component acts for a lowering of the drive torque.

The present invention will be better understood from the description of a preferred embodiment thereof as set forth below, with reference to the accompanying drawings.

DESCRIPTION OF A PREFERRED EMBODIMENT

Figure 1:
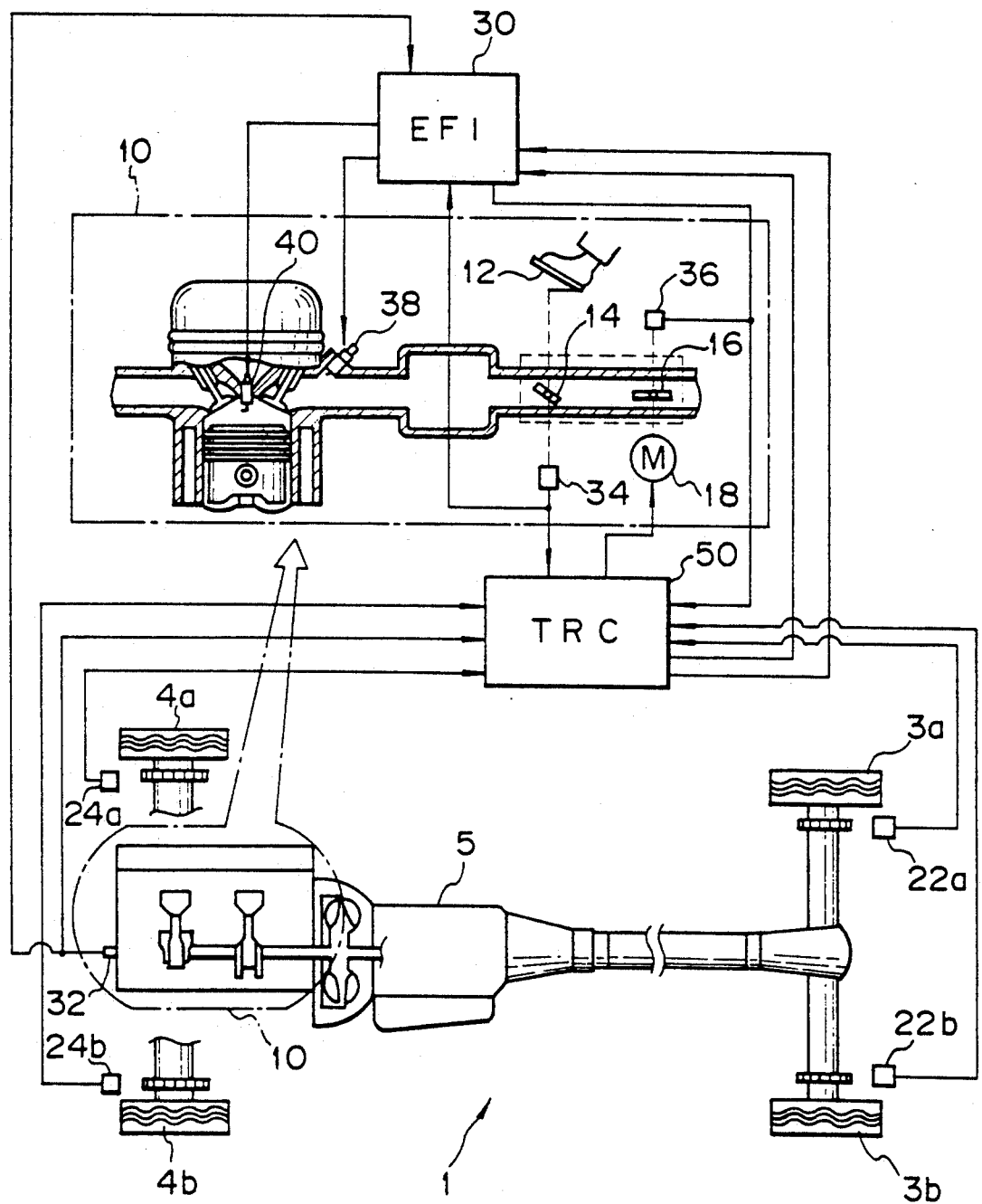
FIG. 1 is a schematic view of a vehicle fitted with an acceleration slip control device.

FIG. 1 illustrates an embodiment of the acceleration slip control device according to the present invention.

Referring to FIG. 1, reference numeral 1 represents a vehicle, 10 denotes an engine mounted on the vehicle 1, 3a, 3b represent driving wheels of the vehicle 1 to which a drive torque is transmitted from the engine 10 through a gear box 5, and 4a, 4b represent driven wheels of the vehicle 1.

Wheel speed sensors 22a, 22b, 24a, 24b, which detect the speed of rotation of the wheels, are provided at the driving wheels 3a, 3b and the driven wheels 4a, 4b of the vehicle 1.

Numeral 14 denotes a main throttle valve disposed in the inlet air passage of the engine 10 for adjusting an inlet air flow in accordance with the amount of depression of an accelerator pedal 12 by a driver.

In this embodiment, separately from the main throttle valve 12, a subthrottle valve 16 is disposed in the inlet air passage upstream of the main throttle valve 14. The subthrottle valve 16 is driven by an actuator such as a stepper motor 18, and can be actuated independently from the main throttle valve 14.

Numeral 30 is a fuel injection control unit (hereinafter called "EFI unit") which controls the amount of fuel injected and the ignition timing of the engine 10. The EFI unit 30 is a known type of digital computer which includes a CPU (central processing unit), a ROM (read only memory), a RAM (random access memory), and input and output terminals. In the performance of these control procedures, an engine speed signal is input from an engine speed sensor 32 to the EFI unit 30, and signals representing a degree of opening of the main throttle valve 14 and the subthrottle valve 16 are input from opening angle sensors 34 and 36 respectively. Although not shown in the drawing, other signals required for various control procedures are input from corresponding sensors.

The EFI unit 30 is connected to fuel injection valves 38 and ignition plugs 40 via an appropriate driving circuit (not shown) and controls the amount of fuel injected and the ignition timing of the engine 10.

Numeral 50 is a control unit 50 which performs an acceleration slip control according to the present invention.

The control unit 50 (hereinafter called "TRC unit") is also a known type of digital computer having a construction similar to that of the EFI unit 30.

To perform an acceleration slip control, the speed of rotation of each wheel 3a, 3b, 4a, 4b is input to the TRC unit 50 from the wheel speed sensors 22a, 22b, 24a, 24b, respectively. Also, the engine speed signal, signals representing a degree of opening of the main throttle valve 14 and the subthrottle valve 16 are input to the TRC unit from the engine speed sensor 32 and opening angle sensors 34, 36, respectively.

The TRC unit 50 is connected to the stepper motor 18 of the subthrottle valve 16, to control the opening angle thereof. Further, the TRC unit 50 is connected to the EFI unit and feeds signals thereto to initiate a fuel cut control and a ignition timing retard control thereby.

In this embodiment, the TRC unit controls the degree of opening $\theta_s$ of the subthrottle valve 16, by PID control based on the deviation $\Delta V$ of the speed of rotation of the driving wheels 3a and 3b from the target speed. The degree of opening $\theta_s$ of the subthrottle valve is determined by calculations based on the following equations:

$$\theta_{s(n)} = \theta_{s(n-1)} + (d\theta_s/dt) \cdot T_O \quad (1)$$

$$d\theta_s/dt = K_1 \cdot \Delta V + K_2 \cdot K_3 \cdot \Delta G \quad (2)$$

Where, $\theta_{s(n)}$ is a setting of the degree of opening of the subthrottle valve, $\theta_{s(n-1)}$ is the degree of opening of same when the above calculations were executed last time, and $T_O$ is an interval for repeating the above calculations. $\Delta V$ is the deviation of the speed of rotation of the driving wheels from the target speed $V_S$ for the speed of rotation of the driving wheels i.e., $\Delta V = V_S - V_D$. The target speed $V_S$ is determined from an actual running speed of the vehicle (i.e., a speed of rotation $V_R$ of the driven wheels 4a, 4b of the vehicle) by a procedure explained later.

$\Delta G$ in the formula (2) is a difference between the rate of change of the vehicle speed $V_R$ and speed of rotation of the driving wheels $V_D$, i.e., $\Delta G = dV_R/dt - dV_D/dt$. Also, $\Delta G$ can be expressed as $\Delta G = d(V_R - V_D)/dt$ and therefore, $(-\Delta G)$ represents the rate of change of the slippage of the driving wheels. $K_1$, $K_2$, $K_3$ in the formula (2) are a positive constant.

As explained later, the rate of change of the vehicle speed $dV_R/dt$ is substantially equal to the rate of change of the target value of the speed of rotation of the driving wheel $dV_S/dt$.

Therefore:

$$\begin{aligned}
\Delta G &= dV_R/dt - dV_D/dt \\
&= dV_S/dt - dV_D/dt \\
&= d(V_S - V_D)/dt \\
&= d\Delta V/dt
\end{aligned}$$

and $(-\Delta G) = d(V_D - V_R)/dt$.

From the formula (2):

$$\begin{aligned}
d\theta_s/dt &= K_1 \cdot \Delta V + K_2 \cdot K_3 \cdot \Delta G \\
&= K_1 \cdot \Delta V + K_2 \cdot K_3 \cdot d\Delta V/dt.
\end{aligned}$$

Namely, $d\theta_s/dt$ in the formula (2) includes a component proportional to the deviation $\Delta V$ from the target speed and a component proportional to the rate of change of the deviation $d\Delta V/dt$ (which is equal to a negative value of the rate of change of the slippage of the driving wheels.)

As explained before when the drive torque is controlled by the component proportional to the rate of change of the slippage (i.e., $d\Delta V/dt$), the drive torque tends to become lower on a rough road, and thus the acceleration of the vehicle is worsened.

In the present invention, to prevent this worsening of the acceleration, different values are used for the constant $K_3$ in the formula (2), depending on the positive or negative values of $\Delta G$.

When $\Delta G$ is positive, which means that the deviation $\Delta V$ ($= V_S - V_D$) is increasing (i.e., the speed of rotation of the driving wheels is decreasing), the proportional constant $K_3$ is set to a larger value to thereby increase the drive torque by a larger amount, and when $\Delta G$ is negative, the proportional constant $K_3$ is set to a smaller value to prevent a large decrease of the drive torque.

Figure 2:
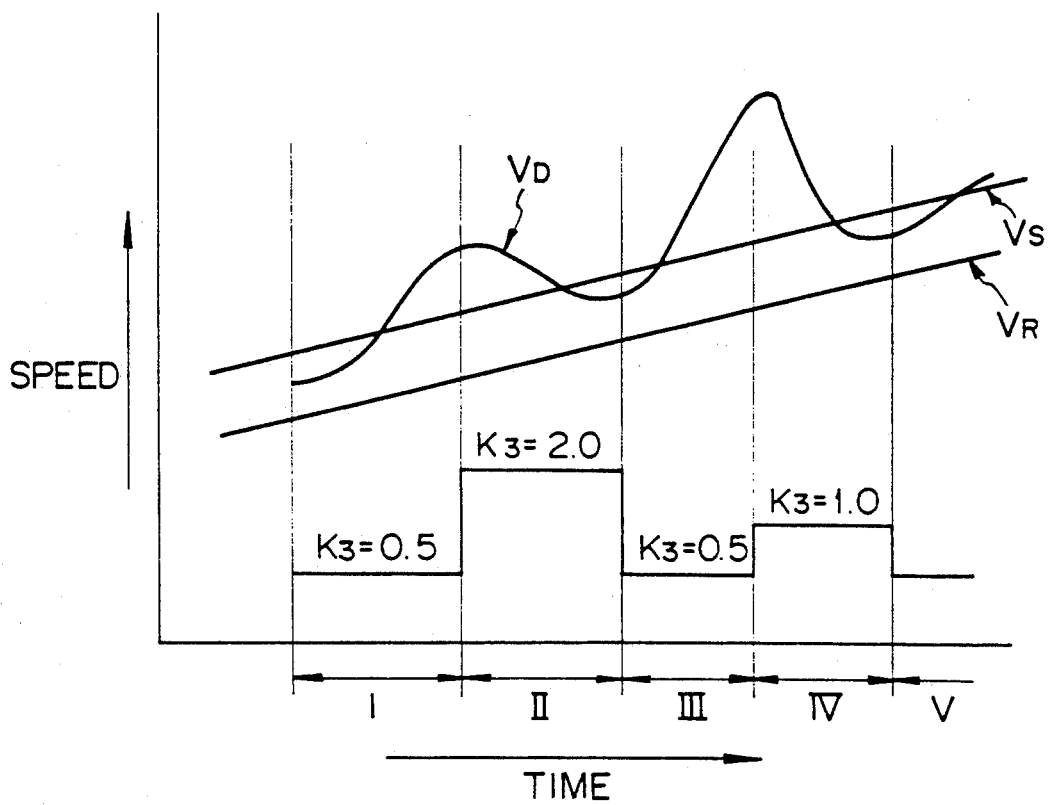
FIG. 2 illustrates an example of a change of a speed of rotation of the driving wheels under the acceleration slip control; and, FIGS. 3, 3A-C, 4-6, 6A, 6B, 7, and 8 are examples of flow charts of routines for the acceleration slip control.

FIG. 2 illustrates the relationships among the vehicle speed $V_R$, the target value $V_S$ for the rotation speed of the driving wheels, the speed of rotation $V_D$ of the driving wheels, and the value of the constant $K_3$. In the drawing, the vertical axis represents $V_R$, $V_S$, $V_D$ and $K_3$ and the horizontal axis represents a time. In the sections I and III of the drawing, in which $dV_S/dt$ (the inclination of the $V_S$ line) is smaller than $dV_D/dt$ (the inclination of the $V_D$ line), the value of $\Delta G$ ($= dV_S/dt - dV_D/dt$) becomes negative. Consequently the $\Delta G$ term in the formula (2) acts to decrease the degree of opening $\theta_s$ of the subthrottle valve. In this case, the proportional factor $K_3$ is set to a relatively small value (in this embodiment, $K_3$ is set at 0.5). Conversely, in the section II, in which $\Delta G$ becomes positive, the $\Delta G$ term in the formula (2) acts to increase the degree of opening $\theta_s$. In this case, the proportional factor $K_3$ is set to a relatively larger value (in this embodiment, $K_3$ is set at 2.0) to increase the drive torque by a large amount.

In this embodiment, as shown in the section IV of the drawing, when the deviation $V_s - V_D$ becomes smaller than a predetermined negative value, (i.e., the actual slip between the driving wheels and the road surface is very large) a fuel cut control or an ignition timing retard control is performed in addition to the subthrottle valve control. When the fuel cut control or the ignition timing retard control is performed, the proportional factor $K_3$ is kept at 1.0 from the start of these control procedures to a predetermined time after the completion thereof, to wait until the effect of these control procedures appears.

The acceleration slip control operation of this embodiment is now explained in detail, using the flow charts shown in FIG. 3 to FIG. 8.

(1) Basic control

Figure 3B:
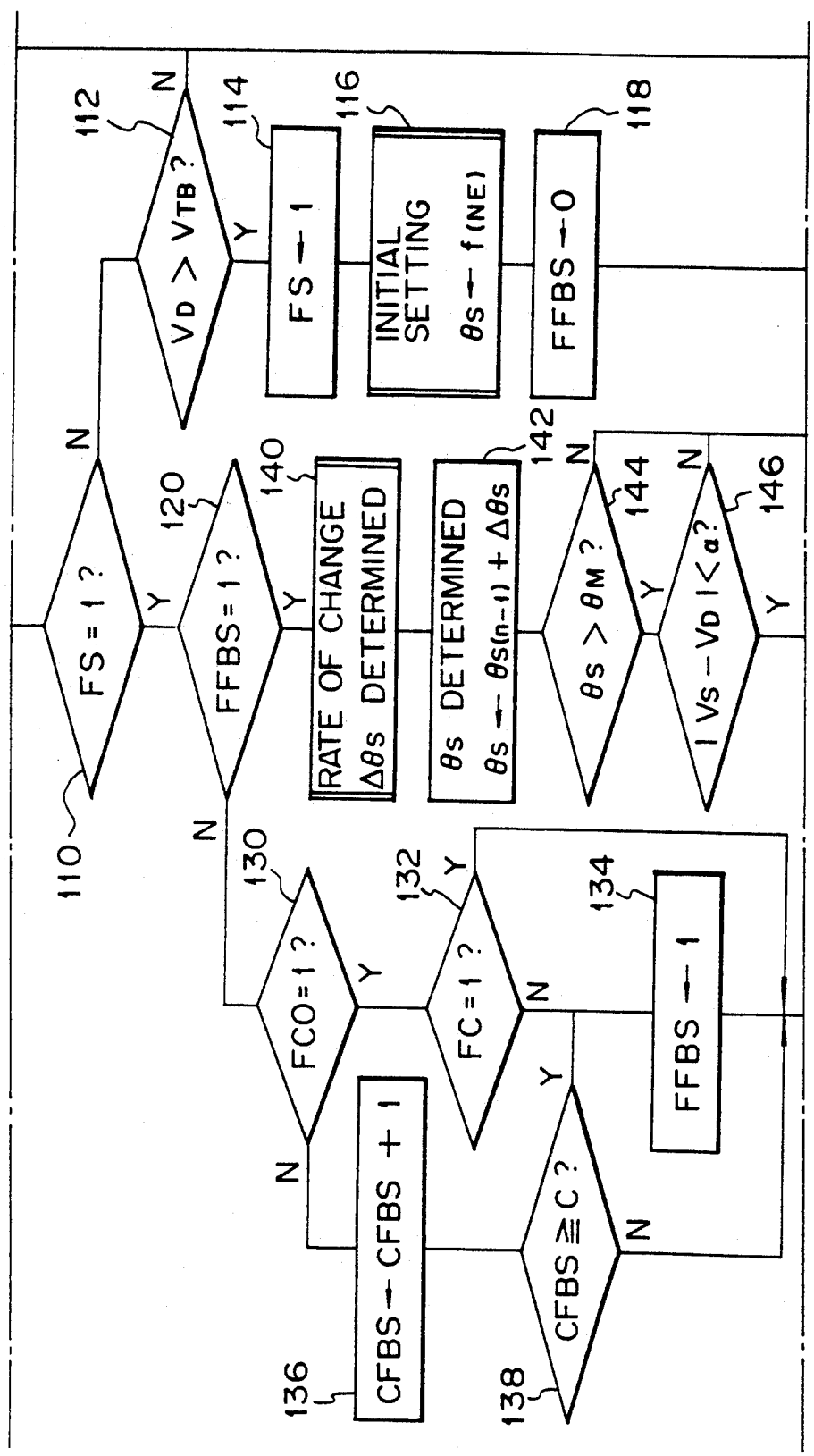
Figure 3C:
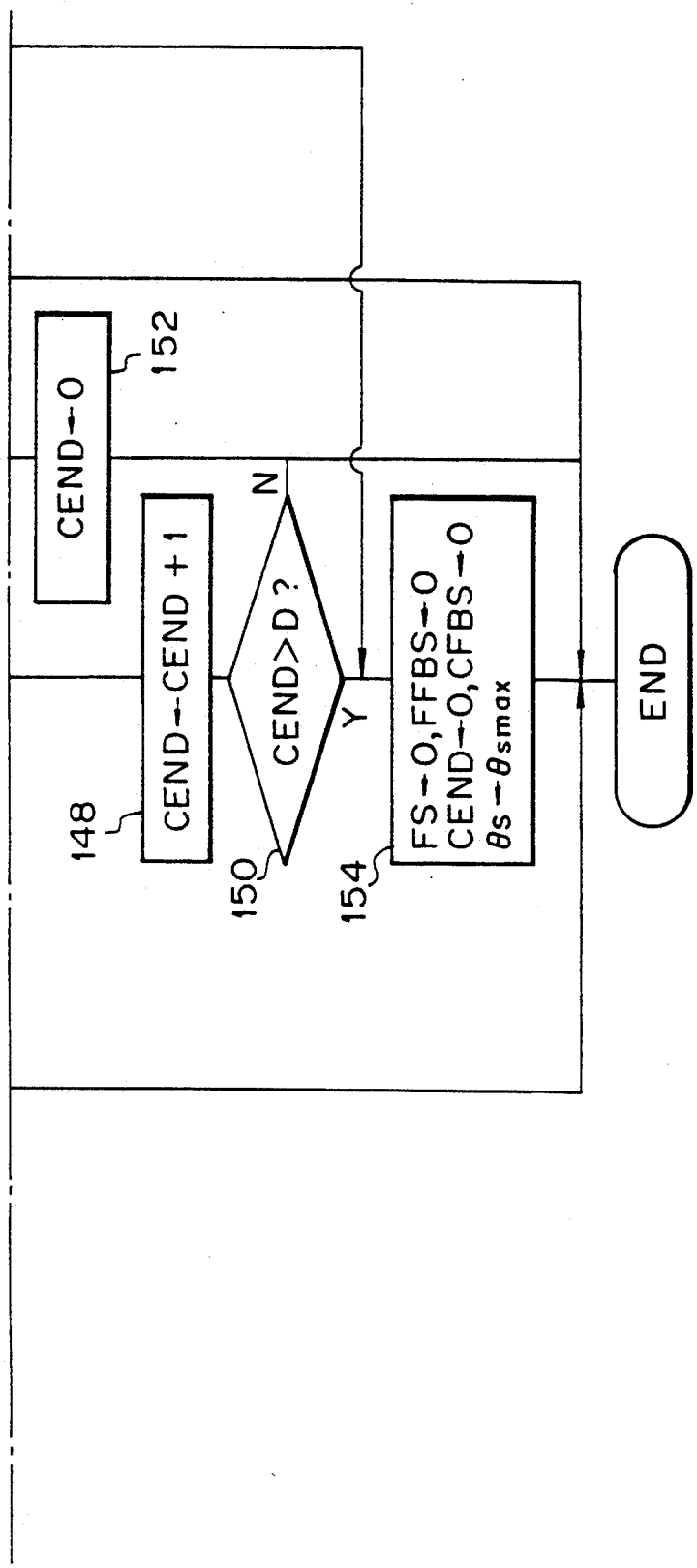

FIG. 3 illustrates a main routine for an acceleration slip control. This routine is processed by the TRC unit 50 by sequential interruptions at predetermined intervals (e.g., 12 msec).

Referring to FIG. 3, in step 100, it is determined whether the conditions permitting an acceleration slip control are satisfied. In this embodiment, the acceleration slip control is allowed only when the degree of the opening $\theta_M$ of the main throttle valve is not fully closed and various sensors are operating correctly.

If these conditions are not satisfied, the routine proceeds to step 154, in which all of the flags are reset and the degree of opening of the subthrottle valve is set at $\theta_s$ max (fully open condition), and the routine is then terminated.

If the conditions are satisfied in step 100, then steps 102 to 108 are executed. In step 102, the vehicle speed $V_R$ is calculated as a mean value of the speeds of rotation $V_{RR}$ and $V_{RL}$ of the right and the left driven wheels 4a and 4b of the vehicle, and the target speed $V_S$ is then determined from $V_R$ in step 104.

In this embodiment $V_S$ is calculated by the following formulas.

(a) When $V_R \leq 30$ km/h $$V_S = V_R + 2.4 \text{ km/h}$$

(b) When 30 km/h $< V_R \leq 100$ km/h $$V_S = 1.08 \cdot V_R \text{ km/h}$$

(c) When $V_R > 100$ km/h $$V_S = 1.08 \cdot V_R \text{ km/h or } V_S = V_R + 10 \text{ km/h}$$

whichever is smaller.

The target speed $V_S$ is always made larger than the vehicle speed $V_R$, to obtain an appropriate slip between the driving wheels and a road surface.

As shown by the formulas (a)–(b), when the vehicle speed is low, a slip rate $(V_S - V_R)/V_R$ is made relatively large, to thus improve the acceleration of the vehicle, but when the vehicle speed is high, the slip rate is made small, to improve the straight line stability.

After determining the target speed, in step 106, a speed $V_{TB}$ is determined. The speed $V_{TB}$, which represents the speed at which the acceleration slip control is started, is calculated by $V_{TB} = V_S + \beta$, where $\beta$ is a predetermined constant which is set between 2.0 km/h—4.0 km/h according to the type of the vehicle and the road condition; $\beta$ is also used for setting $V_{TB}$ sufficiently higher than $V_S$ that a frequent acceleration slip control operation is prevented.

The speed of rotation of the driving wheels $V_D$ is determined in step 108 as a mean value of the speeds of rotation $V_{DR}$ and $V_{DL}$ of the right and the left driving wheels 3a, 3b of the vehicle.

After setting the above parameters in steps 102 to 108, in step 110 it is determined whether a flag FS is set or reset. The flag FS indicates whether the acceleration slip control has been started or not started. When the flag FS is reset, which means the acceleration slip control is not started, then the routine proceeds to step 112 to determine whether or not the acceleration slip control should be started. This determination is made by comparing the driving wheel speed $V_D$ with the speed $V_{TB}$, and when $V_D \leq V_{TB}$, since the acceleration slip control is not required, the flags are reset and $\theta_s$ is set to $\theta_s$ max (fully open condition) in step 154.

In step 112, when $V_D > V_{TB}$, the flag FS is set (step 114), $\theta_s$ is set at an initial setting value $f_{(NE)}$ (step 116), and the flag FFBS is reset (step 118). The initial setting value $f_{(NE)}$ is determined from the engine speed NE and the road conditions, by a routine not described here. The reason for setting $\theta_s$ at the initial setting value $f_{(NE)}$ is because the subthrottle valve is maintained in the fully open condition before starting the acceleration slip control, and a longer time is required to obtain the effect of the control procedure if the feedback control of the subthrottle valve is started from this position. Therefore, in step 116, the subthrottle valve is closed to a predetermined position at the start of the control procedure, so that the feedback control of the subthrottle valve becomes effective from the start of the control.

When the initial setting of the subthrottle valve is completed, a flag FFBS is reset in step 118. When the flag FFBS is reset, the feedback control of the subthrottle valve is not started until the FFBS is set in step 134, as explained later.

In step 110, when the flag FS is set, i.e., when steps 112 to 118 have been executed, the routine proceeds to step 120, the value of the flag FFBS is determined, and when FFBS=0, steps 130 to 138 are executed. In steps 130 to 138, it is determined whether or not the feedback control of the subthrottle valve can be started. The feedback control is allowed only when one of the following conditions is satisfied:

(a) An initial fuel cut control operation is completed.

(b) A predetermined time has elapsed after the start of the acceleration slip control and the initial fuel cut control operation has not been started.

As explained later, a fuel cut operation or an ignition timing retard operation is performed only one time, at the start of the acceleration slip control, to improve the response of the control. During the fuel cut operation or the ignition timing retard operation, the feedback control of the subthrottle valve is not effective, and therefore, the feedback control is not allowed unless the above conditions are satisfied in steps 130 to 138.

In step 130, it is determined whether or not the flag FCO is set. As explained later in FIG. 6, the flag FCO is set when the initial fuel cut operation is started. When the flag FCO is set, in step 132, it is determined whether or not a flag FC is set.

The flag FC is set during the fuel cut operation, and therefore, when the flag FC is set in step 132, the routine is terminated without setting the flag FFBS.

When the flag FC is reset in step 132, which means that the initial fuel cut control has been started (FCO =1 in step 130) and completed (FC=0), the routine proceeds to step 134 and the flag FFBS is set.

If the flag FCO is reset in step 130, i.e., if the initial fuel cut control has not been started, the value of the counter CFBS is increased by one in step 136. Then, in step 138, it is determined whether the value of the counter CFBS is equal to or larger than a predetermined value C. The value C is determined from the interval $T_O$ of the processing of the routine, in such a manner that $C \cdot T_O \approx 500$ msec. If CFBS$\geq$C, i.e., if 500 msec has elapsed after starting the acceleration slip control, in step 134, the flag FFBS is set even if the initial fuel cut control operation has not started.

When the flag FFBS is set in step 120, the feedback control of the subthrottle valve opening $\theta_s$ is performed Namely, the rate of change $\Delta\theta_s$ of the subthrottle valve opening $\theta_s$ is determined in step 140, and a setting of the throttle valve opening $\theta_s$ is determined as $\theta_s=\theta_{s(n-1)}+\Delta\theta_s$ and is output to the stepper motor of the subthrottle valve.

The determination of the rate of change $\Delta\theta_s$ is explained later in FIG. 4.

Steps 144 to 152 show the process for determining the termination of the acceleration slip control. In this embodiment, the acceleration slip control is terminated when both of the following conditions are maintained for a predetermined period (step 150):

(a) The subthrottle valve opening $\theta_s$ is larger than the main throttle valve opening $\theta_M$ (step 144), and (b) The absolute value of the deviation $|V_S-V_D|$ is smaller than a predetermined value $\alpha$ (step 146).

The value of the constant $\alpha$ for a deviation in step 146 and the constant D for the period in step 150 are determined according to the type of vehicle: CEND in steps 148, 150, 152, 154 is a counter for measuring the time elapsed.

When the above conditions are satisfied in step 150, then the routine is terminated after executing step 154, in which the flags FS, FFBS and the counters CFBS, CEND are reset and the subthrottle valve opening $\theta_s$ is set at $\theta_s$ max (fully open condition).

(2) Determination of the rate of change $\Delta\theta_s$

Figure 4:
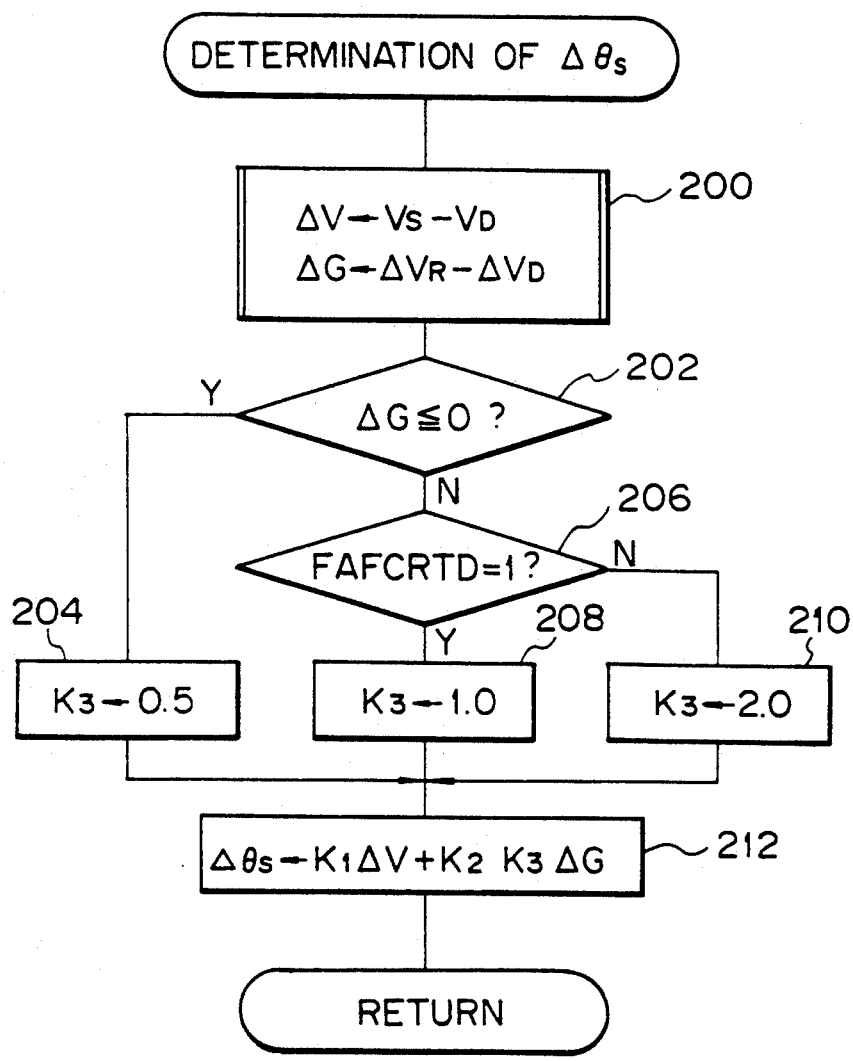

FIG. 4 shows a subroutine for determining $\Delta\theta_s$, as performed in step 140 in FIG. 3.

Referring to FIG. 4, in step 200, the deviation $\Delta V = V_S - V_D$ and the rate of change $\Delta G$ is calculated. The rate of change $\Delta G$ is calculated by the following equation:

$$\Delta G=\{V_{R(n)}-V_{R(n-1)}\}-\{V_{D(n)}-V_{D(n-1)}\}$$

where $V_{R(n-1)}$ is the running speed of the vehicle read in step 102 of the routine of FIG. 3 when the routine was executed last time, and $V_{R(n)}$ is the same when step 102 is executed this time.

Similarly $V_{D(n-1)}$ and $V_{D(n)}$ are the driving wheel speeds of the vehicle when the routine was executed last time and this time.

Then, in step 202, it is determined whether the value of $\Delta G$ is plus or minus. As explained before, the proportional factor $K_3$ is set at 0.5 (step 204) when $\Delta G$ is minus. When $\Delta G$ is plus, in step 206, it is determined whether or not a flag FAFCRTD is set. As explained later in FIG. 5, the flag FAFCRTD is set when the fuel cut operation and/or the ignition timing retard operation starts, and is reset when a predetermined time (in this embodiment, 102 msec) has elapsed after said operation ($\Delta$) is completed. If the flag FAFCRTD is set, which means that the slippage of the driving wheels is affected by the fuel cut or ignition timing retarding, $K_3$ is set to 1.0 (step 208). When the flag FAFCRTD is reset in step 206, since the slippage of the driving wheels is not affected by the fuel cut or the ignition timing retarding, $K_3$ is set to a relatively larger value of 2.0 (step 210).

Then, in step 212, the rate of change $\Delta\theta_s$ of the subthrottle valve opening is determined using the value $K_3$ determined above. This $\Delta\theta_s$ is calculated by $\Delta\theta_s=K_1\cdot\Delta V+K_2\cdot K_3\cdot\Delta G$, where $K_1$ and $K_2$ are constants determined in accordance with the type of vehicle.

Figure 5:
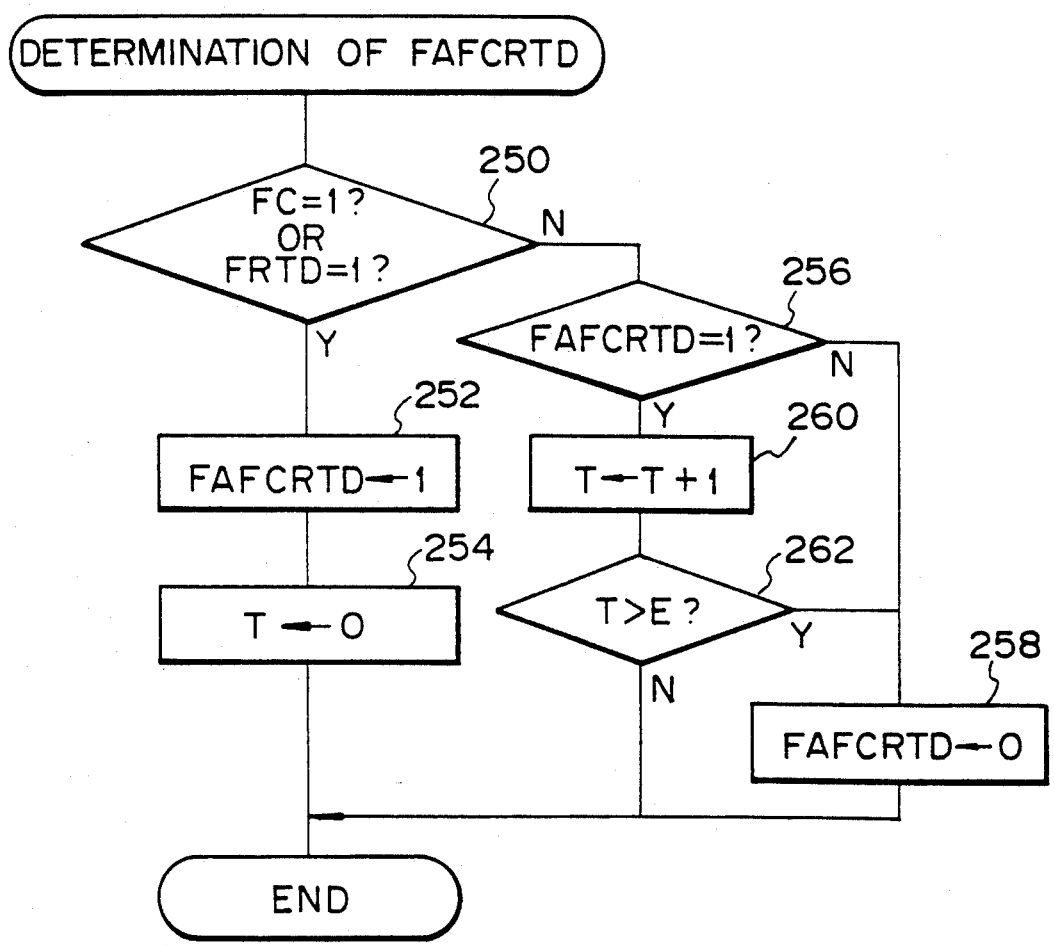

FIG. 5 shows the routine for setting the flag FAFCRTD in FIG. 4. This routine is processed by the TRC unit by sequential interruptions at predetermined intervals. By this routine, the flag FAFCRTD is set when either the fuel cut operation or the ignition timing retard operation is started, and is reset when a condition continues for 102 msec in which neither of the above operations is carried out.

In FIG. 5, FC and FRTD are flags which are set during the fuel cut control operation and ignition timing retard control operation, respectively.

The parameter T in step 262 represents a counter for measuring the time, and E is a constant which has a value equal to the number of executions of the routine corresponding to 102 msec.

Since FIG. 5 is self-explanatory, a further explanation thereof is omitted.

(3) Initial fuel cut and ignition timing retard control

Figure 6B:
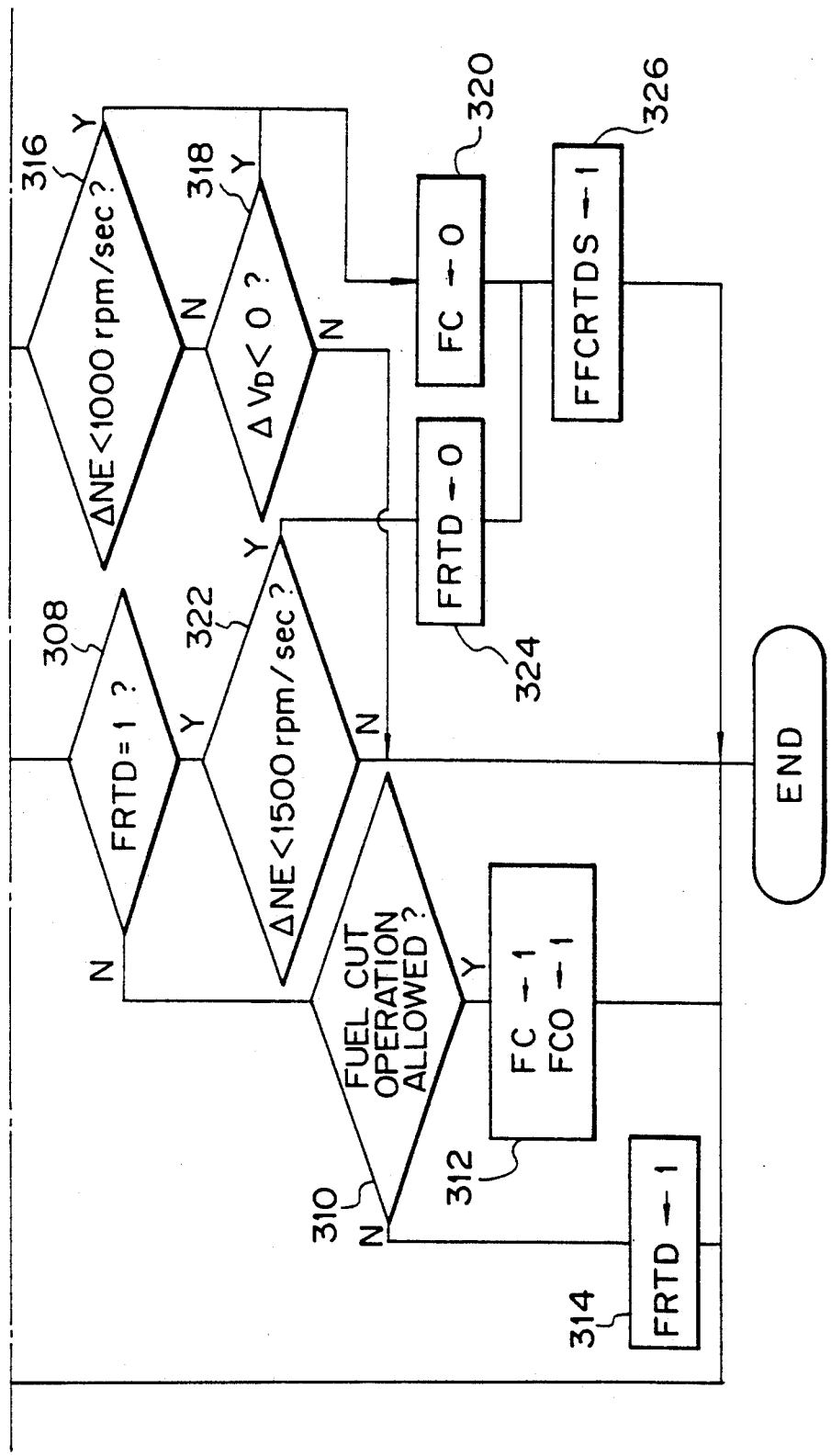

FIG. 6 shows a routine for the initial fuel cut control and the ignition timing retard control. This routine is processed by TRC unit separately from the routine in FIG. 3, by sequential interruptions at predetermined intervals.

The purpose of this control is to reduce the driving wheel speed by performing a fuel cut or ignition timing retarding only one time after the acceleration slip control is started. The initial fuel cut and the ignition timing retarding is performed regardless of the magnitude of the slippage.

The actual control operations for the fuel cut and the ignition timing retarding are performed by the EFI unit (FIG. 1, 30) according to the values of the flags FC and FRTD set by this routine.

Referring to FIG. 6, in step 300 it is determined from the value of the flag FS set in step 114 in FIG. 3, whether or not the acceleration slip control has started. When the acceleration slip control has not started (i.e., FS =0 in step 300), the routine is terminated after resetting the flags FFCRTDS and FCO in step 302. The flag FFCRTDS is set when the initial fuel cut or the initial ignition timing retarding is performed and completed. Similarly, the flag FCO is set when the initial fuel cut is performed and completed.

When the acceleration slip control has started, in step 304 it is determined whether or not the flag FFCRTDS is set. When the flag FFCRTDS is set, this means that the initial fuel cut or the initial ignition timing retarding is completed, and thus the routine is terminated without performing a further fuel cut or ignition timing retarding. In step 304, if the flag FFCRTDS is not set, then in steps 306 and 308 it is determined whether the flags FC and FRTD are set. When neither of the flags FC and FRTD are set, in steps 310 to 314 either the fuel cut or the ignition timing retarding is performed.

In this embodiment, the initial fuel cut control is given priority over the initial ignition timing retarding, and when conditions allow, the initial fuel cut control operation is carried out. Step 310 represents the determination of whether the conditions for performing the initial fuel cut are satisfied. These conditions are, for example, that the detectors are operating correctly, or the temperature of cooling water is higher than a predetermined value, etc.

When these conditions are satisfied, the routine proceeds to step 312 in which both of the flags FC and FCO are set. When the flag FC is set, the fuel cut operation is carried out by the EFI unit. When the conditions are not satisfied in step 310, the routine proceeds to step 314 in which the flag FRTD is set. When the flag FRTD is set, the EFI unit performs the ignition timing retard operation.

If FC=1 in step 306, i.e., if the initial fuel cut is being performed, in steps 316 and 318 it is determined whether the initial fuel cut operation should be terminated.

The initial fuel cut operation is terminated when the rate of increase $\Delta NE$ of the engine speed becomes less than 1000 rpm/sec (step 316), or the rate of change $\Delta V_D$ of the driving wheel speed becomes negative (step 318) because when the reduction in rate of increase of the engine speed or a decrease of the driving wheel speed occurs, it is considered that the effect of the initial fuel cut has appeared. Then the routine proceeds to step 320 in which the flag FC is reset, and thus the EFI unit terminates the initial fuel cut operation. When the initial fuel cut operation is completed, the routine is terminated after setting the flag FFCRTDS in step 326.

In step 308, if FRTD is set, i.e., if the ignition timing retard operation is being carried out, then the routine proceeds to step 322. In step 322, it is determined whether the ignition timing retard operation should be terminated. The ignition timing retard operation is terminated when the rate of increase $\Delta NE$ of the engine speed becomes less than 1500 rpm/sec. In step 322, if this condition is satisfied, the routine proceeds to step 324 in which the flag FRTD is reset, and thus the EFI unit terminates the ignition timing retard operation. Then, the routine is terminated after setting the flag FFCRTDS in step 326.

(4) Large slip fuel cut control

Figure 7:
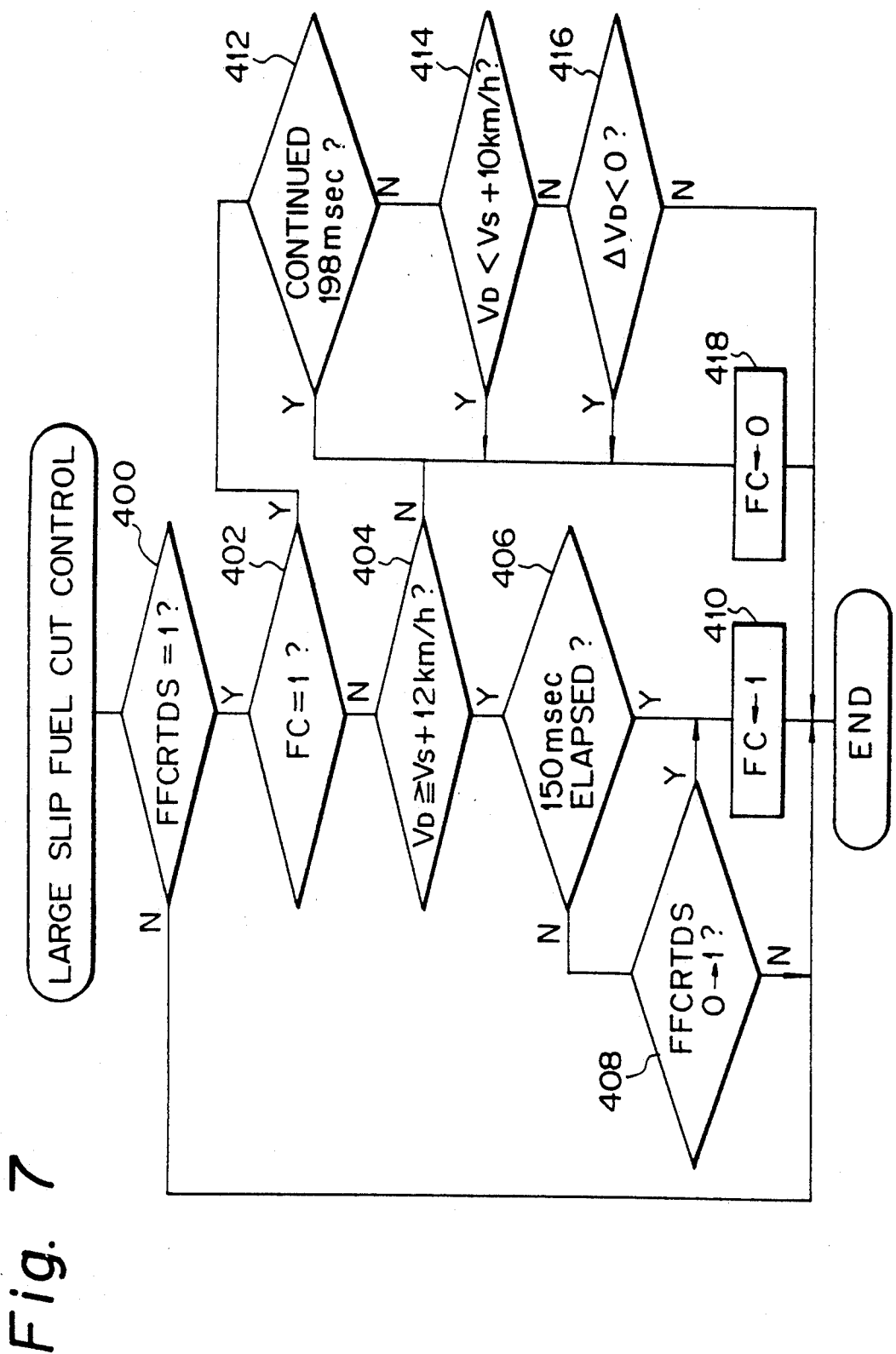

FIG. 7 shows the routine for a large slip fuel cut control, which is performed separately from the control of the subthrottle valve opening (FIG. 3) and the initial fuel cut control (FIG. 6) when the deviation from the target speed becomes very large. This routine is processed by the TRC unit by sequential interruptions at predetermined intervals.

Referring to FIG. 7, steps 400 to 408 show the routine for determining whether or not the conditions for starting the large slip fuel cut operation are satisfied. In this embodiment, the large slip fuel cut operation is started when all of the following conditions are satisfied:

(a) The initial fuel cut or the initial ignition timing retarding is completed (FFCRTDS =1 in step 400).

(b) The fuel cut operation is not being carried out. (FC=0 in step 402).

(c) The driving wheel speed $V_D$ exceeds the target speed $V_S$ by 12 km/h or more (step 404).

(d) More than 150 msec have elapsed from the completion of the preceding fuel cut operation or ignition timing retard operation (step 406).

When all of the above conditions are satisfied, the flag FC is set in step 410, and the EFI unit starts the fuel cut operation.

The reason why a lapse of 150 msec is required from the preceding fuel cut or ignition timing retarding is to prevent possible damage to the catalysts in the exhaust gas converter due to an increase of the exhaust gas temperature, which is caused by repeating the fuel cut or ignition timing retarding at frequent intervals. Step 408 represents the determination of whether this execution of the routine is for the first time since the flag FFCRTDS was set in step 326 in FIG. 6. If the execution is for the first time, then this means that the slippage of the driving wheels is still large even after the completion of the initial fuel cut or initial ignition timing retarding, and therefore, the routine proceeds to step 410, and the fuel cut is carried out even though the time lapsed is less than 150 msec.

In step 402, if it is determined that the fuel cut operation is now being carried out, then steps 412 to 416 are executed and it is determined whether the conditions for terminating the fuel cut operation are satisfied.

The fuel cut operation is terminated when any one of the following conditions is satisfied:

(a) The fuel cut operation has continued for 198 msec or more. (step 412).

(b) The driving wheel speed $V_D$ becomes less than the target speed $V_{S+}10$ km/h (step 414).

(c) The driving wheel speed is decreasing. (step 416).

If one of the above conditions is satisfied, the flag FC is reset in step 418, and the EFI unit terminates the fuel cut operation.

(5) Large slip ignition timing retard control

Figure 8:
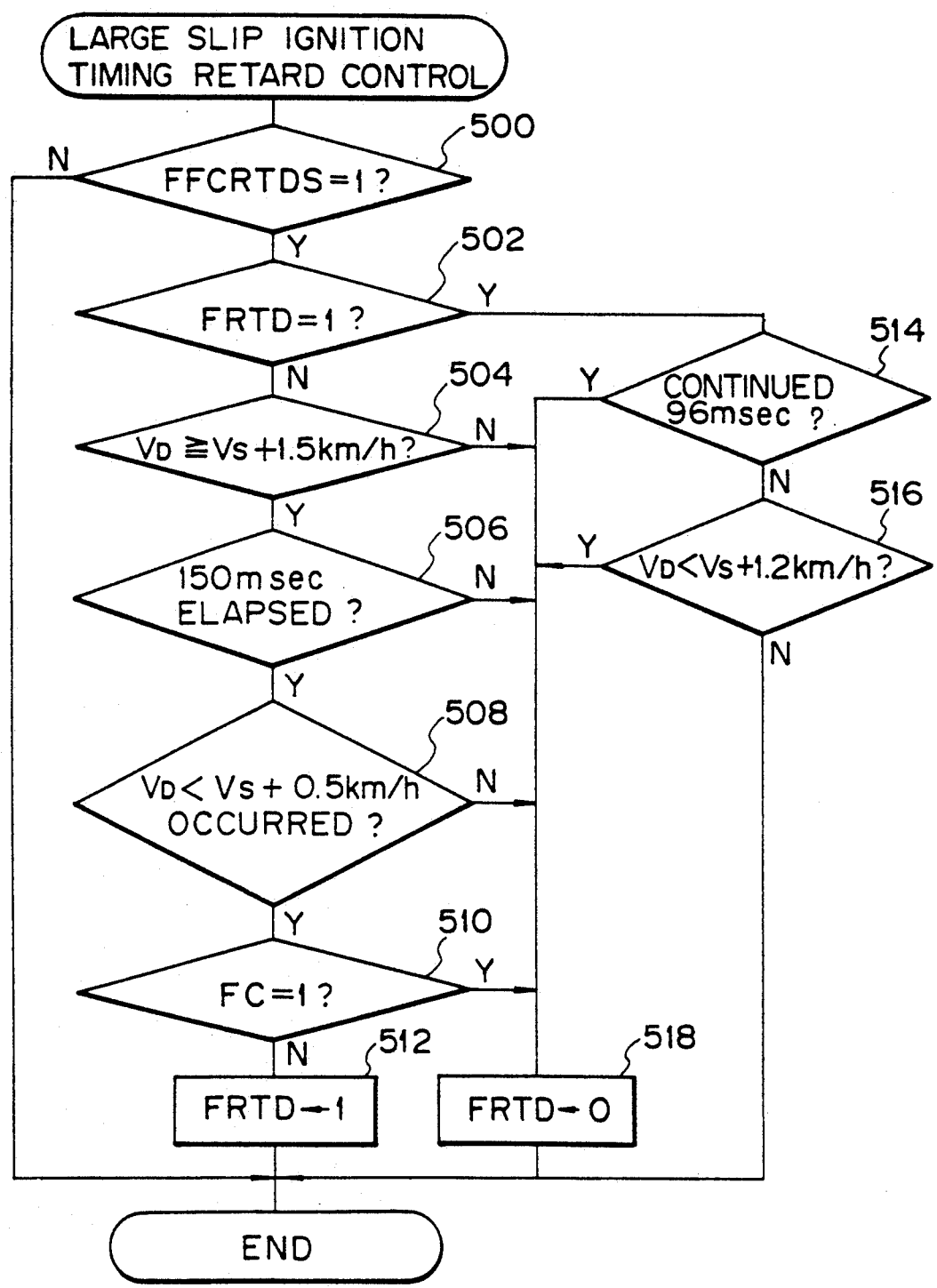

FIG. 8 shows the routine for a large slip ignition timing retard control, which is performed separately from the control of the subthrottle valve opening (FIG. 3) when the deviation from the target speed is relatively large. This routine is processed by the TRC unit by sequential interruptions at predetermined intervals.

Referring to FIG. 8, in steps 500 through 510, it is determined whether the conditions for starting a large slip ignition timing retard operation are satisfied. The large slip ignition timing retard operation is started when all of the following conditions are satisfied.

(a) The initial fuel cut operation or the initial ignition timing retard operation is completed (FFCRTDS =1 in step 500), (b) The ignition timing retard operation is not being carried out (FRTD=0 in step 502).

(c) The driving wheel speed $V_D$ exceeds the target speed $V_S$ by 1.5 km/h or more (step 504).

(d) 150 msec have elapsed since the completion of the preceding fuel cut or ignition timing retarding. (step 506).

(e) After completion of the preceding ignition timing retarding, the driving wheel speed has once decreased to less than $V_{S+}0.5$ km/h (step 508).

(f) The fuel cut operation is not being carried out (step 510).

The reason for the need for the condition (e) is, if the driving wheel speed $V_D$ has not decreased to near the target speed $V_S$ after the completion of the preceding ignition timing retarding, this means that the subthrottle valve opening control is still being carried out, and therefore, it is preferable not to perform a further ignition timing retarding but to wait until the effect of the subthrottle valve opening control appears.

Similarly, the reason for the need for the condition (f) is that, if the fuel cut operation is being carried out, it is preferable to wait until the effect of the fuel cut appears.

When all of the above conditions (a)–(f) are satisfied, the flag FRTD is set in step 512, and the EFI unit retards the ignition timing by a predetermined amount.

In step 502, if it is determined that the ignition timing retard operation has started, the routine proceeds to steps 514 and 516 in which it is determined whether the ignition retard operation should be terminated.

The ignition timing retard operation is terminated when either of the following conditions is satisfied:

(a) The ignition timing retard operation has continued for 96 msec or more (step 514);

(b) The driving wheel speed becomes less than the target speed $V_S$ plus 1.2 km/h (step 516).

The reason for the prohibiting of the ignition retard operation from being continued for more than 96 msec by the above condition (a) is to avoid an excess temperature rise of the exhaust gas due to the ignition timing retarding.

In this embodiment, when the deviation from the target speed is relatively small, the slippage of the driving wheels is controlled by adjusting the subthrottle valve according to the amount of deviation and the rate of change thereof. Further, when the deviation from the target speed is relatively large, the slippage of the driving wheels is controlled by the ignition timing retarding, and when the deviation is very large, the slippage of the driving wheels is controlled by the fuel cut. Therefore, an improved response of the acceleration slip control is obtained for various magnitudes of slippage.

As explained above, according to the present invention, an improved acceleration of the vehicle is obtained even on a rough road, where the rate of change of the slippage varies widely, by using different proportional factors of the component of the drive torque rate of change to the rate of change of the slippage, depending on whether the value of the rate of change of the slippage is positive or negative.

We claim:

1. An acceleration slip control device for controlling a slippage between driving wheels of a vehicle and a road surface during an acceleration of the vehicle, comprising:

first parameter means for setting a first parameter relating to an amount of slip between the driving wheels of the vehicle and the road surface;

second parameter means for setting a second parameter relating to a rate of change of the amount of the slip between said driving wheels and the road surface;

control means for generating a control signal based on said first and second parameters, at least a component of said control signal being proportional to said second parameter; and drive torque adjusting means for adjusting a drive torque of said driving wheels in such a manner that a rate of change of said driving torque is determined according to said control signal;

wherein, a proportional factor of said component of said control signal to said second parameter is selected according to the value of said second parameter in such a manner that the value of the proportional factor selected when said component acts to increase the drive torque is larger than the value of the proportional factor selected when said component acts to decrease the drive torque.

2. An acceleration slip control device according to claim 1, wherein said control signal generated by said control means further includes a component proportional to said first parameter.

3. An acceleration slip control device according to claim 1, wherein said first parameter means comprises a means for detecting a speed of rotation of the driving wheels of the vehicle, a means for detecting a running speed of the vehicle, and a means for setting a target speed based on said running speed of the vehicle;

wherein said first parameter is defined as the difference between said target speed and said speed of rotation of the driving wheel.

4. An acceleration slip control device according to claim 3, wherein said second parameter means comprises a means for detecting a rate of change of the speed of rotation of the driving wheels, and a means for detecting a rate of change of the running speed of the vehicle;

wherein said second parameter is defined as the difference between said rates of change.

5. An acceleration slip control device according to claim 1, wherein said drive torque adjusting means comprises a throttle valve disposed in an intake air passage of the engine of the vehicle and an actuator for actuating said throttle valve at a rate determined by said control signal.

6. An acceleration slip control device according to claim 5, further comprising a drive torque decreasing means for decreasing the drive torque when the amount of slip between the driving wheels and a road surface is larger than a predetermined value.

* * * * *